US012651516B1

(12) United States Patent
Simpson et al.

(10) Patent No.: US 12,651,516 B1
(45) Date of Patent: Jun. 9, 2026

(54) EASY VIEW WI-FI SIGNAL INDICATOR

(71) Applicant: CONFINEMENT TELEPHONY TECHNOLOGY, LLC, Greensboro, NC (US)

(72) Inventors: Shannon Neil Simpson, Winston-Salem, NC (US); Timothy Edwin Pabon, Greensboro, NC (US); Rick Allen Lubbehusen, Winston-Salem, NC (US); John Vincent Townsend, III, Kernersville, NC (US)

(73) Assignee: CONFINEMENT TELEPHONY TECHNOLOGY, LLC, Greensboro, NC (US)

( * ) Notice: Subject to any disclaimer, the term of this patent is extended or adjusted under 35 U.S.C. 154(b) by 56 days.

(21) Appl. No.: 18/581,124

(22) Filed: Feb. 19, 2024

Related U.S. Application Data

(60) Provisional application No. 63/446,957, filed on Feb. 20, 2023.

(51) Int. Cl.
| | |
|---|---|
| *G08B 21/00* | (2006.01) |
| *G08B 5/38* | (2006.01) |
| *G08B 21/18* | (2006.01) |
| *H04L 41/22* | (2022.01) |

(52) U.S. Cl.
CPC ............. *G08B 5/38* (2013.01); *G08B 21/182* (2013.01); *H04L 41/22* (2013.01)

(58) Field of Classification Search
CPC .......... G08B 5/38; G08B 21/182; H04L 41/22
USPC ......................................................... 340/331
See application file for complete search history.

(56) References Cited

U.S. PATENT DOCUMENTS

| | | | |
|---|---|---|---|
| 8,904,538 B1 | 12/2014 | Glick et al. | |
| 10,439,921 B1 | 10/2019 | Dubey et al. | |
| 10,477,511 B2 * | 11/2019 | Ohlarik ................. | H04W 4/027 |
| 10,484,114 B1 * | 11/2019 | Nijim ................... | H04B 17/391 |
| 2011/0151864 A1 * | 6/2011 | Byun ................... | H04W 40/16 |
| | | | 455/445 |
| 2018/0336448 A1 | 11/2018 | Van Meter, II | |
| 2020/0097946 A1 * | 3/2020 | Bian ................... | G06Q 20/209 |
| 2020/0193745 A1 * | 6/2020 | Morris ................ | G07C 9/0073 |
| 2020/0328797 A1 | 10/2020 | Gajula et al. | |
| 2021/0110369 A1 * | 4/2021 | Hamasako ....... | G06Q 20/40155 |

* cited by examiner

*Primary Examiner* — Mark S Rushing
(74) *Attorney, Agent, or Firm* — Thompson Hine LLP

(57) ABSTRACT

Some implementations disclosed herein enable users of electronic devices to recognize when device issues may be the result of no or poor Wi-Fi connectivity by making Wi-Fi signal information more easily accessible, visually prominent, graphically indicating an application's dependence upon a Wi-Fi signal, or otherwise providing useful connectivity information in a noticeable and easy to understand manner. This may involve providing a graphic indication of Wi-Fi signal strength on a tablet device used in a prison, jail, or other confinement institution.

23 Claims, 4 Drawing Sheets

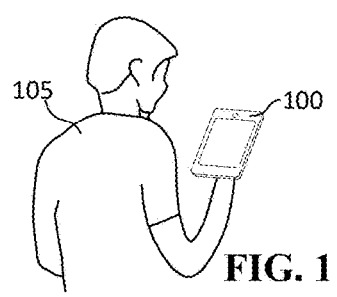
FIG. 1
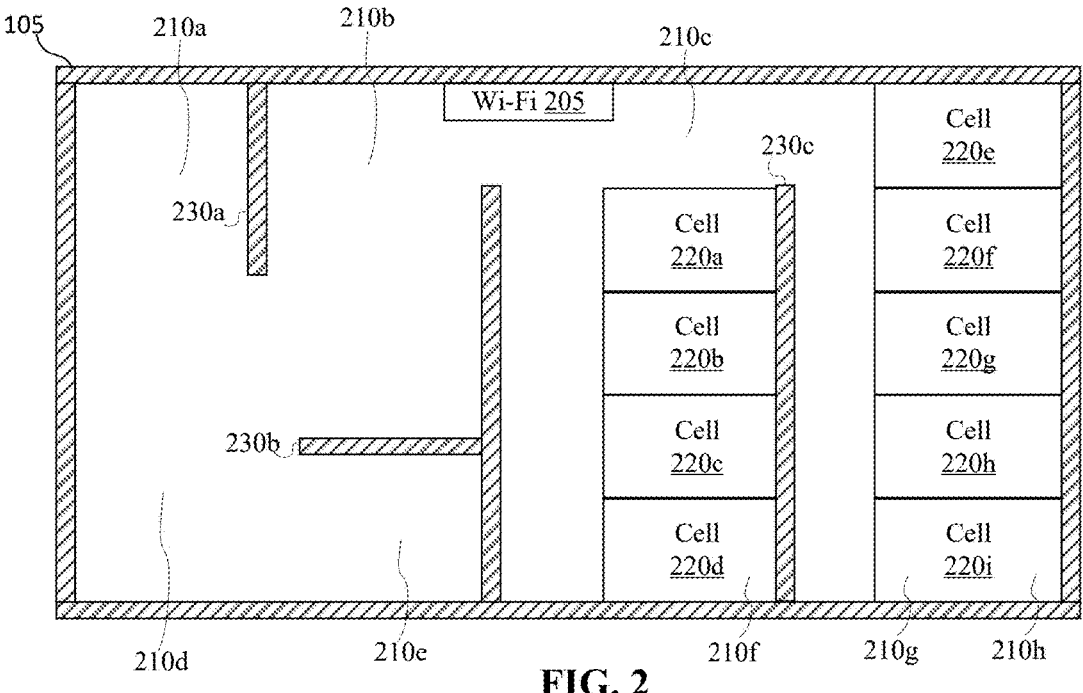
FIG. 2
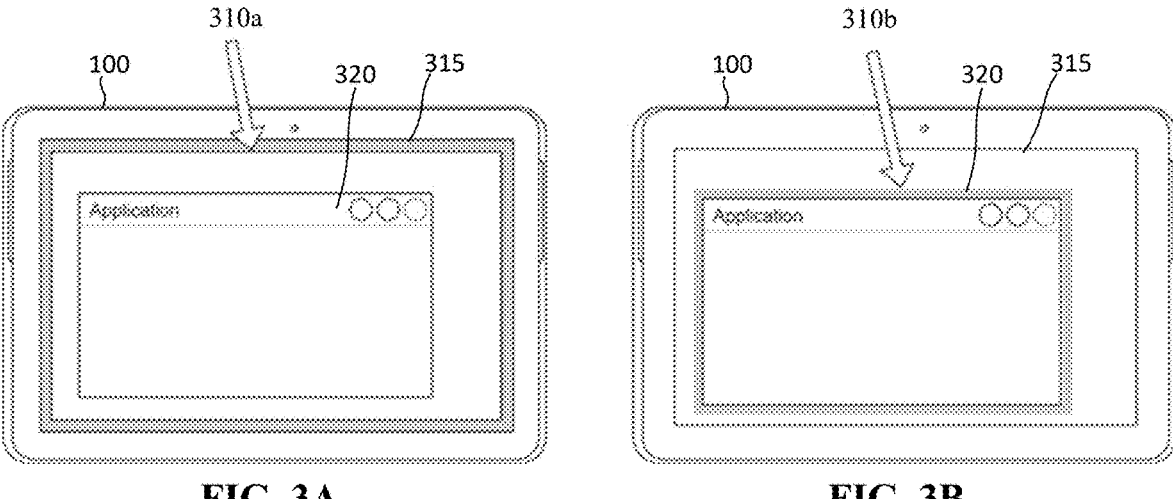
FIG. 3A                    FIG. 3B

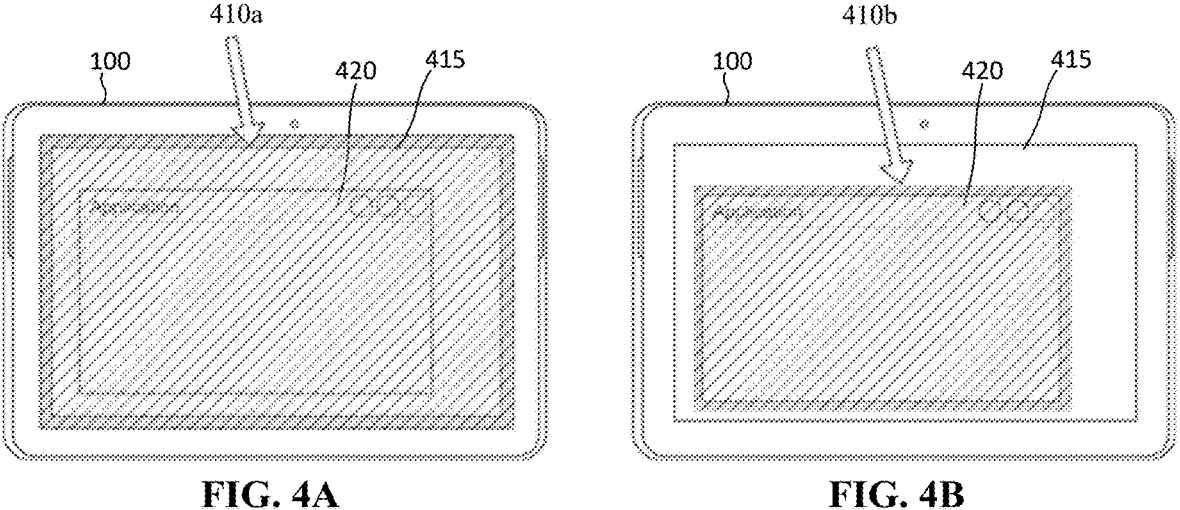
FIG. 4A                    FIG. 4B
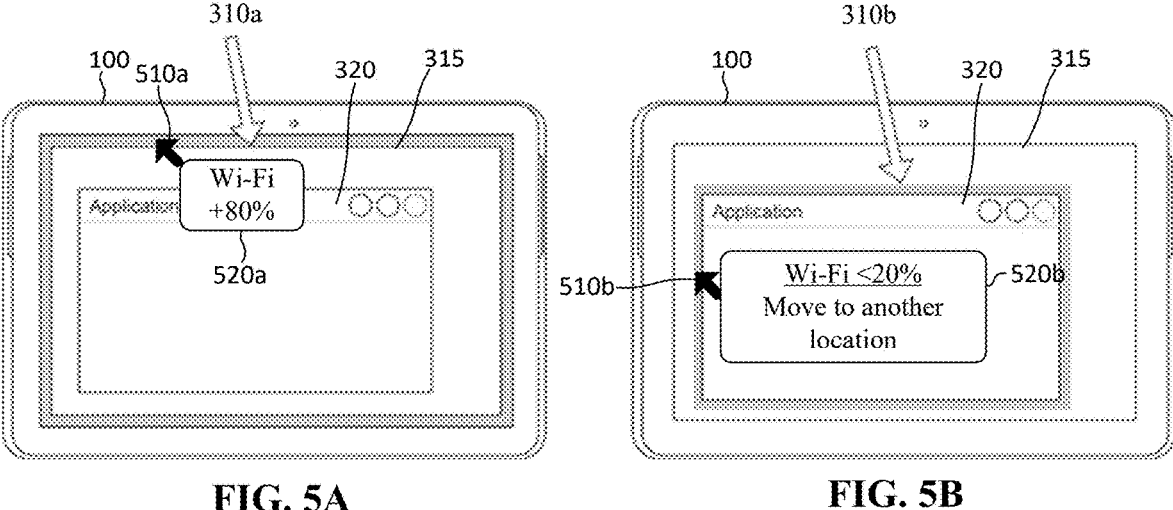
FIG. 5A                    FIG. 5B

600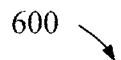

<div style="border:1px solid black">

602
Determine a current Wi-Fi status of a device at a position
within a facility offering Wi-Fi service </div>

<div style="border:1px solid black">

604
Display user interface content on a
display of an electronic device

</div>

<div style="border:1px solid black">

606
Display a Wi-Fi indicator based on the current Wi-Fi status,
where the Wi-Fi indicator is displayed along multiple sides of a
border area of (a) the display area or (b) the window and where
the Wi-Fi indicator comprises a color or pattern representing the
current Wi-Fi status of the device </div>

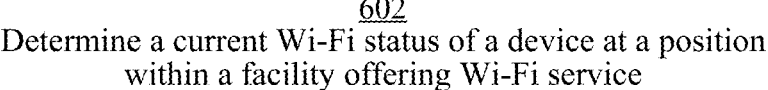

FIG. 6

EASY VIEW WI-FI SIGNAL INDICATOR

CROSS-REFERENCE TO RELATED APPLICATIONS

This application claims the benefit of U.S. Provisional Application Ser. No. 63/446,957 filed Feb. 20, 2023, which is incorporated herein in its entirety.

TECHNICAL FIELD

The present disclosure generally relates to providing information to electronic device users to enable them to more easily understand Wi-Fi status, the causes of devices not functioning as expected, application requirements with respect to Wi-Fi, and providing other information useful to the device users.

BACKGROUND

It can be very frustrating to users of electronic devices when their electronic devices do not function as expected. Such circumstances can be particularly frustrating to people, such as inmates in confinement institutions, who have limited or no access to technical assistance from technical experts or other sources. Moreover, when devices do not operate as expected due to network connectivity issues (e.g., due to insufficient Wi-Fi in a particular location due to a wall or other signal obstruction), such device inoperability may be wrongly attributed to the devices themselves being defective. This may result in greater feelings of user frustration and negative emotional responses, and potentially result in user activities that cause physical damage to the devices.

SUMMARY

Some implementations disclosed herein enable users of electronic devices to recognize when device issues may be the result of no or poor Wi-Fi connectivity. Some implementations do so by making Wi-Fi signal information more easily accessible, visually prominent, graphically indicating an application's dependence upon a Wi-Fi signal, or otherwise providing useful connectivity information in a noticeable and easy to understand manner. This may involve providing a graphic indication of Wi-Fi signal strength on a device (e.g., an inmate's tablet device) used in a prison, jail, or other confinement institution.

In some implementations, a method is performed via a processor of an electronic device executing stored instructions. The method determines a current Wi-Fi status of the device at a position within a facility (e.g., within a confinement facility) offering Wi-Fi service. The method displays user interface content (e.g., content provided by one or more applications in one or more windows) on a display of the electronic device. The method displays a Wi-Fi indicator based on the current Wi-Fi status. The Wi-Fi indicator may be displayed with characteristics that enhance its noticeability and/or its ability to attract a user's attention. Such characteristics may make Wi-Fi status easier to recognize in comparison, for example, to only using a small icon in a small area to indicate Wi-Fi status. For example, in some implementations of the invention, a Wi-Fi indictor may be displayed along the entirety of one or more sides of a border area of (a) a device's entire display area or (b) a particular application's window. The Wi-Fi indicator may additionally or alternatively be displayed with characteristics that identify a level of Wi-Fi is available, e.g., the Wi-Fi indicator may comprise a color or pattern representing the current Wi-Fi status of the device. The characteristics of the Wi-Fi indicator may make it easy to distinguish circumstances in which sufficient Wi-Fi (e.g., more than a threshold level required for a particular application's use or another particular purpose) is available. For example, an entire boarder area may turn a particular color (e.g., red), flash, or otherwise exhibit attention grabbing characteristics when insufficient Wi-Fi is available. In another example, an entire display area or an entire window area may exhibit a colorful tint (e.g., red), flash, or otherwise exhibit attention grabbing characteristics when insufficient Wi-Fi is available. A Wi-Fi indicator may include notifications, e.g., text, sounds, etc. that indicate the nature of the issue and/or potential corrective actions the user can take, e.g., a message that states: "Insufficient Wi-Fi available at this location, try moving to another spot," or "Wi-Fi service is not available at this time, try again later."

In some implementations, a method is performed via a processor of an electronic device executing stored instructions. The method determines a current Wi-Fi status of the electronic device at a position within a facility offering Wi-Fi service. The method determines to display a Wi-Fi indicator based on the current Wi-Fi status not satisfying a requirement, where the requirement corresponds to a function provided by one or more applications executing on the electronic device. The method displays the Wi-Fi indicator indicating that the current Wi-Fi status does not satisfy the requirement.

In some implementations, a method is performed via a processor of a device executing stored instructions. The method executes an application that provides user interface content and determines a Wi-Fi requirement of the application. The Wi-Fi requirement of the application may, for example, specify that the application requires access to a network or resource only available via Wi-Fi and/or Wi-Fi having at least minimum characteristics (e.g., signal strength). The method determines to display a Wi-Fi status indicator with the application based on the Wi-Fi requirement of the application. The method displays the user interface content provided by the application in a window on a display of the electronic device, where the Wi-Fi indicator is displayed along a border area of the window and comprises a color representing a current Wi-Fi status of the device. The Wi-Fi indicator may be displayed along one or more (e.g., all) entire sides of the window. The Wi-Fi indicator may form a rectangular border framing the window on all sides. The Wi-Fi indicator may tint all or most of a display area or window with a particular color. The color of the Wi-Fi indicator may indicate a strength of Wi-Fi signal that the device is currently receiving, e.g., green is strong, yellow is medium, red is weak/no signal. An application with a different Wi-Fi requirement, e.g., not requiring any network or other resources accessible via Wi-Fi, may be displayed without a Wi-Fi indicator.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 1 illustrates an example operating environment for a user using an electronic device, in accordance with some implementations.

FIG. 2 illustrates the provision of Wi-Fi in an exemplary facility, in accordance with some implementations.

FIGS. 3A-3B illustrate exemplary Wi-Fi indicators provided by the exemplary device of FIG. 1, in accordance with some implementations.

FIGS. 4A-4B illustrate exemplary Wi-Fi indicators provided by the exemplary device of FIG. 1, in accordance with some implementations.

FIGS. 5A-5B illustrate exemplary Wi-Fi indicators provided by the exemplary device of FIG. 1, in accordance with some implementations.

FIG. 6 is a flowchart representation of an exemplary method of indicating Wi-Fi status, in accordance with some implementations.

Figure 7:
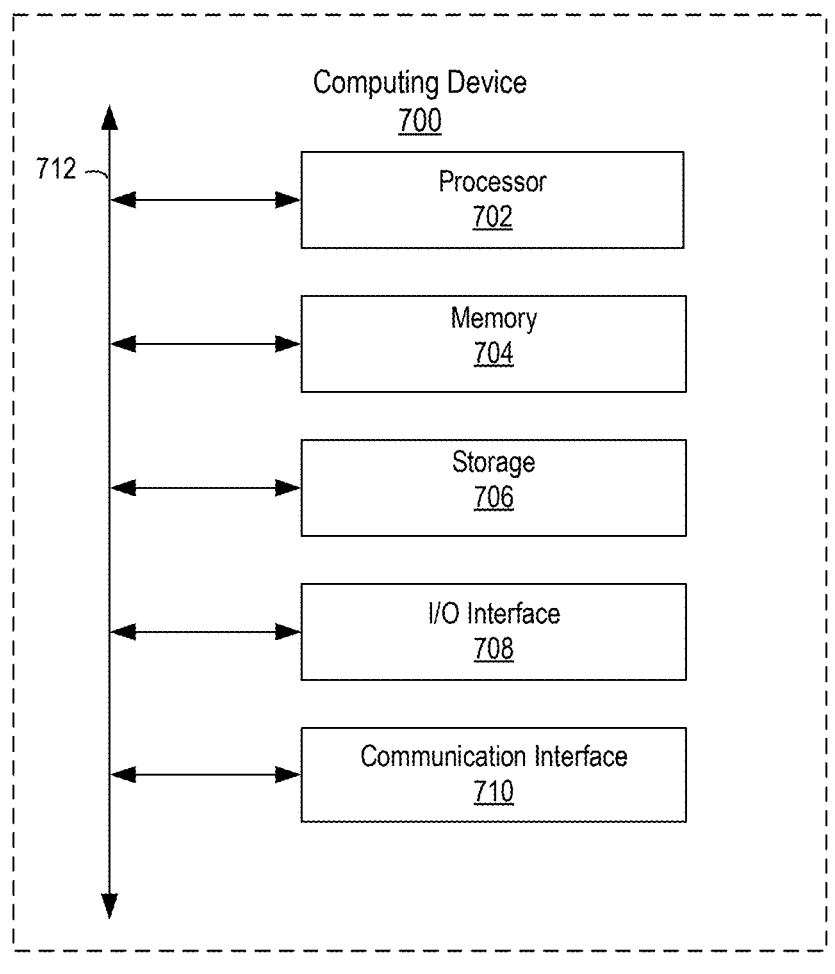
FIG. 7 is an example electronic device in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Existing Wi-Fi signal indicators are often too small to draw a user's attention, obscured from view by application content, or otherwise difficult for a user to understand and associate with an application that the Wi-Fi signal may be affecting. They may not provide sufficient information about an immediate change in signal strength or may not be visible at all due to customized applications (e.g., particularly on inmate devices) that use/cover that area of the display for other purposes. When an inmate is moving around in a jail or other confinement facility, the signal can be lost easier than it would be for someone at home due to the differences in building construction, e.g., concrete walls, block walls, metal structures, etc. This can impact important communications from the inmate to friends and family, interrupt content that is required, or content paid for with limited funds.

To help an inmate understand when Wi-Fi is affecting device performance/functionality and/or take remedial action (e.g., by moving to a different location), a Wi-Fi indicator is provided that provides more intuitive and usable information. The Wi-Fi indictor may be implemented by displaying a border around the edge of a display or around the area of focus of one or more applications. The indicator may be configured to tint a display or window in certain conditions. The indicator may be configured to use an easily understood color-coded representation of the Wi-Fi signal (e.g., signal strength). For example, green may be used for an acceptable signal level, yellow for lower but functional signal, and red for very low or loss of signal. The threshold for each color could be for all applications or configured differently depending on the content being presented. For example, text and image viewing may tolerate a lower signal than streaming audio or video.

A Wi-Fi indicator may be configured to have attributes that are indicative of signal strength and/or to draw the user's attention at certain times or in certain conditions. In some implementations, a size or shape of a Wi-Fi indicator is indicative of signal strength. For example, a border area used as an indicator may have a thickness that depends upon signal strength, e.g., being thicker for respectively stronger Wi-Fi or vise versa. In another example, a border area may be configured to flash, blink, or otherwise display animated change over time to draw the user's attention to the Wi-Fi indicator. It may be configured to have such time-varying appearance in certain conditions. For example, the Wi-Fi indicator may present a constant color, shape, etc. (or may not be displayed at all) while Wi-Fi signal strength is above a certain threshold, but may change to present a different and/or changing color, shape, etc. while Wi-Fi signal strength is below the threshold, or vise versa. In one example, a Wi-Fi indicator is configured to have an attention-grabbing attribute (e.g., changing over time, flashing, large size, a particular color, etc.) when the Wi-Fi signal is absent or below a threshold.

FIG. 1 illustrates an example operating environment for a user 105 using an electronic device 100. In this example, the device 100 is a tablet held by the user 105. In other examples, the device 100 may be a mobile device, laptop, desktop, kiosk, or any other electronic device.

FIG. 2 illustrates the provision of Wi-Fi in an exemplary facility. The facility 200, in this example, includes cells 220a-i and a Wi-Fi communications component 205 (e.g., a Wi-Fi transmitter/receiver). Obstructions within the facility 200 (e.g., concrete wall, metal, etc.) may interfere with communication signals between devices operated by inmates within the facility 200 and the Wi-Fi communications component 205. For example, strong Wi-Fi signal strength may be available at locations 210b, 210c, 210d, 210f. In contrast, reduced or moderate Wi-Fi signal strength may be available at location 210h (e.g., due to partial obstruction from wall 230c) and very low or no Wi-Fi signal strength may be available at location 210a (due to obstruction from wall 230a), 210e (due to obstruction from wall 230b), and location 210g (due to obstruction from wall 230c). Some implementations disclosed herein assess Wi-Fi status of devices within such a facility and provide indications to a device user that better enable the user to understand, when the device does not operate as expected, the cause of such issues (e.g., due to Wi-Fi or not) and/or how to address such issues (e.g., by moving to another location, waiting, etc.).

FIGS. 3A-3B illustrate exemplary Wi-Fi indicators provided by the exemplary device 100 of FIG. 1. In the example of FIG. 3A, the Wi-Fi indicator 310*a* is presented around the entire border of the display area 315, e.g., forming a continuous path or border along all 4 sides of the display area 315. In alternative implementations, the indicator 310*a* may occupy less than all four sides (e.g., 1 side, 2 sides, or 3 sides) and/or may occupy only one or more portions along a given side. In FIG. 3B, the Wi-Fi indicator 310*b* is presented around the entire border of the application window 320, e.g., forming a continuous path or border along all 4 sides. Such a border may be within the boundaries of the application window 320, outside of the boundary of the application window 320 (e.g., displayed on or over the surrounding content), or both. In alternative implementations, the indicator 310*b* may occupy less than all four sides (e.g., 1 side, 2 sides, or 3 sides) and/or may occupy only one or more portions along a given side.

FIGS. 4A-4B illustrate exemplary Wi-Fi indicators provided by the exemplary device 100 of FIG. 1. In the example of FIG. 4A, the Wi-Fi indicator 410*a* is a tint covering all of the display area 415. In alternative implementations, the indicator 410*a* may cover less than all of the display area 415, e.g., tinting only 10%, 20%, 80%, etc. In some implementations such tinting partially obscures content as a means of grabbing the user's attention. In FIG. 4B, the Wi-Fi indicator 410*b* is a tint presented over all of the application window 420. In alternative implementations, the indicator 410*b* may cover less than all of the window 420 area, e.g., tinting only 10%, 20%, 80%, etc.

FIGS. 5A-5B illustrate exemplary Wi-Fi indicators provided by the exemplary device 100 of FIG. 1. In the example of FIG. 5A, the Wi-Fi indicator 510*a* is presented around the entire border of the display area 515, e.g., forming a continuous path or border along all 4 sides of the display area 515. Moreover, additional information is presented based on the user having provided input (e.g., touch on a touch screen within the border). In this example, the message indicates that Wi-Fi is currently at 80%. In FIG. 5B, the Wi-Fi indicator 510*b* is presented around the entire border of the application window 520, e.g., forming a continuous path or border along all 4 sides. Moreover, additional information is presented based on the user having provided input (e.g., touch on a touch screen within the border). In this example, the message indicates that Wi-Fi is currently less than 20% and providing a suggestion for the user to "Move to another location."

FIG. 6 is a flowchart representation of an exemplary method of indicating Wi-Fi status. Such a method may be performed by one or more processors executing instructions stored in a non-transitory computer-readable medium, e.g., on device 100 of FIG. 1 or device 700 of FIG. 7.

At block 602, the method 600 involves determining a current Wi-Fi status of the device at a position within a facility offering Wi-Fi service. In some implementations, the operating system and the Wi-Fi driver on the device receives and processes radio signals. An application running within the facility environment may retrieve Wi-Fi signal strength data by utilizing APIs or interfaces provided by the operating system specifically for accessing network-related information. These APIs may allow an application to query the operating system for signal strength data, which is then provided by the underlying Wi-Fi driver. An application could also monitor bandwidth utilization in conjunction with the signal strength to alert the user of sub-optimal network conditions.

At block 604, the method 600 involves displaying user interface content provided on a display of the electronic device.

At block 606, the method involves displaying a Wi-Fi indicator based on the current Wi-Fi status, wherein the Wi-Fi indicator is displayed along multiple sides of a border area of (a) the display area or (b) an application window, wherein the Wi-Fi indicator comprises a color or pattern representing the current Wi-Fi status of the device.

The Wi-Fi indicator may be displayed along an entire side of the window, and/or along all sides of the window. The Wi-Fi indicator may be configured to form a rectangular border framing the window on all sides. The Wi-Fi indicator may be configured to form a rectangular border along the outside perimeter of the display, wherein application content is prevented from covering over the Wi-Fi indicator.

Color may be used to indicate Wi-Fi signal strength. In one example, the color is green and indicates a strong Wi-Fi signal. In another example, the color is red and indicates a weak Wi-Fi signal.

In some implementations, the method 600 further involves executing an application that provides the user interface content, determining a Wi-Fi requirement of the application, and determining to display a Wi-Fi status indicator with the application based on the Wi-Fi requirement of the application. The Wi-Fi requirement of the application may specify that the application requires access to a network or resource only available via Wi-Fi and/or a particular level (e.g., percentage or bandwidth of available signal strength).

In some implementations, the Wi-Fi indictor has size or shape indicative of a signal strength. The Wi-Fi indictor may be configured to flash, blink, or display animated change over time to draw attention to the Wi-Fi indicator.

The Wi-Fi indicator may provide a partially transparent portion that provides a color tint or pattern over all of the display area or all of the window to indicate the Wi-Fi status.

The Wi-Fi indicator may present a constant color, shape, or display attribute while Wi-Fi signal strength is above a threshold and present a changing color, shape, or display attribute while Wi-Fi signal strength is below the threshold.

The Wi-Fi indicator may present a constant color, shape, or display attribute while Wi-Fi signal strength is below a threshold and present a changing color, shape, or display attribute while Wi-Fi signal strength is above the threshold.

The Wi-Fi indicator is configured to have an attention-grabbing attribute when no Wi-Fi signal is available or signal strength is below a threshold.

FIG. 7 is a block diagram depicting an example hardware implementation for devices that may implement the techniques disclosed herein. Each such device 700 may include a processor 702 that is communicatively coupled to memory 704 and storage 706 and that executes computer-executable program code and/or access information stored in the memory 704 and storage 706. The processor 702 may comprise a microprocessor, an application-specific integrated circuit ("ASIC"), a state machine, or other processing device. The processor 702 can include any of a number of processing devices, including just a single processing unit. Such a processor 702 can include or may be in communication with a computer-readable medium storing instructions that, when executed by the processor, cause the processor to perform the operations described herein.

The memory 704 and storage 706 can include any suitable computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, and ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++ C#, Visual Basic, Java, Python, Perl, and JavaScript.

The device 700 may also comprise a number of external or internal devices such as input or output devices. For example, the device 700 may have input/output ("I/O") interface 708 that can receive input from input devices or provide output to output devices. A bus 712 can also be included in the device 700. The bus 712 can communicatively couple one or more components.

The device 700 can also include at least one network interface device or other communication interface 710. The communication interface 700 can include any device or group of devices suitable for establishing a wired or wireless data or telephone connection to one or more networks. Non-limiting examples of a network interface device include an Ethernet network adapter, a modem, and/or the like. A device can transmit messages as electronic or optical signals.

An electronic device can be a computer, a kiosk, a telephone, a mobile device, a tablet, a smart phone, a smart watch, or any other communications device. A device can include a processor, memory, a bus, input/output components, network interface components, and other appropriate communication components. Non-limiting examples of input devices include a touch screen (e.g., one or more cameras for imaging a touch area or pressure sensors for detecting pressure change caused by a touch), a mouse, a keyboard, a camera, a microphone, or any other device that can be used to generate input events in response to actions by a user of a computing device. Input devices may include one or more cameras or other sensors that obtain information about the environment around the device. Non-limiting examples of output devices include an LCD screen, an external monitor, a speaker, or any other device that can be used to display or otherwise present outputs generated by a computing device. The device can execute program code that configures the processor to perform one or more of the operations described above.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not be described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more Implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

The foregoing description and summary of the invention are to be understood as being in every respect illustrative and exemplary, but not restrictive, and the scope of the invention disclosed herein is not to be determined only from the detailed description of illustrative Implementations but according to the full breadth permitted by patent laws. It is to be understood that the Implementations shown and described herein are only illustrative of the principles of the present invention and that various modification may be implemented by those skilled in the art without departing from the scope and spirit of the invention.

What is claimed is:

1. A method, comprising:

at an electronic device having a processor:

determining a current Wi-Fi status of the device at a position within a facility offering Wi-Fi service, the current Wi-Fi status corresponding to current strength of Wi-Fi at the device;

displaying user interface content provided on a display of the electronic device; and displaying a Wi-Fi indicator based on the current Wi-Fi status, wherein the Wi-Fi indicator is displayed along multiple sides of a border area to form a frame around (a) the display area or (b) an application window, wherein a thickness of the Wi-Fi indicator increases or decreases based on increasing or decreasing of the current strength of Wi-Fi at the device.

2. The method of claim 1, wherein the Wi-Fi indicator is displayed along an entire side of the window.

3. The method of claim 1, wherein the Wi-Fi indicator is displayed along all sides of the window.

4. The method of claim 1, wherein the Wi-Fi indicator forms a rectangular border framing the window on all sides.

5. The method of claim 1, wherein the Wi-Fi indicator forms a rectangular border along the outside perimeter of the display, wherein application content is prevented from covering over the Wi-Fi indicator.

6. The method of claim 1, where the color is green and indicates a strong Wi-Fi signal.

7. The method of claim 1, where the color is red and indicates a weak Wi-Fi signal.

8. The method of claim 1 further comprising:
executing an application that provides the user interface content;
determining a Wi-Fi requirement of the application; and
determining to display a Wi-Fi status indicator with the application based on the Wi-Fi requirement of the application.

9. The method of claim 8, wherein the Wi-Fi requirement of the application specifies that the application requires access to a network or resource only available via Wi-Fi.

10. The method of claim 1, wherein the Wi-Fi indictor has size or shape indicative of a signal strength.

11. The method of claim 1, wherein the Wi-Fi indictor is configured to flash, blink, or display animated change over time to draw attention to the Wi-Fi indicator.

12. The method of claim 1, wherein the Wi-Fi indicator further includes a partially transparent portion that provides a color tint or pattern over all of the display area or all of the window to indicate the Wi-Fi status.

13. The method of claim 1, wherein the Wi-Fi indicator presents a constant color, shape, or display attribute while Wi-Fi signal strength is above a threshold and presents a changing color, shape, or display attribute while Wi-Fi signal strength is below the threshold.

14. The method of claim 1, wherein the Wi-Fi indicator presents a constant color, shape, or display attribute while Wi-Fi signal strength is below a threshold and presents a changing color, shape, or display attribute while Wi-Fi signal strength is above the threshold.

15. The method of claim 1, wherein the Wi-Fi indicator is configured to have an attention-grabbing attribute when no Wi-Fi signal is available or signal strength is below a threshold.

16. A method, comprising:
at an electronic device having a processor:
determining a current Wi-Fi status of the electronic device at a position within a facility offering Wi-Fi service, the current Wi-Fi status corresponding to current strength of Wi-Fi at the device;
determining to display a Wi-Fi indicator that is app-specific based on the current Wi-Fi status not satisfying a requirement, wherein the requirement corresponds to a function provided by one or more an application executing on the electronic device; and
displaying the Wi-Fi indicator indicating that the current Wi-Fi status does not satisfy the requirement corresponding to the function provided by the application, wherein the Wi-Fi indicator is displayed along multiple sides of a border area to form a frame around (a) a display area or (b) an application window, wherein a thickness of the Wi-Fi indicator increases or decreases based on increasing or decreasing of the current strength of Wi-Fi at the device.

17. The method of claim 16, wherein the requirement comprises a threshold level of Wi-Fi signal strength required for a video visitation session.

18. The method of claim 16, wherein the requirement comprises a threshold level of Wi-Fi signal strength required for video streaming at a resolution level.

19. The method of claim 16, wherein the Wi-Fi indicator is displayed along multiple sides of a border area of (a) a display area of the electronic device or (b) an application window, wherein the Wi-Fi indicator comprises a color or pattern representing the current Wi-Fi status of the device.

20. An electronic device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the electronic device to perform operations comprising:
determining a current Wi-Fi status of the device at a position within a facility offering Wi-Fi service, the current Wi-Fi status corresponding to current strength of Wi-Fi at the device;
displaying user interface content on a display of the electronic device; and
displaying a Wi-Fi indicator based on the current Wi-Fi status, wherein the Wi-Fi indicator is displayed along multiple sides of a border area to form a frame around (a) the display area or (b) an application window, wherein a thickness of the Wi-Fi indicator increases or decreases based on increasing or decreasing of the current strength of Wi-Fi at the device.

21. The method of claim 1, wherein the Wi-Fi indicator surrounds a portion of the display area or application window that is not obscured by the Wi-Fi indicator.

22. The method of claim 1, wherein the Wi-Fi indicator has width such that a portion of the display area or application window is not obscured by the Wi-Fi indicator.

23. The method of claim 1, wherein the Wi-Fi indictor is displayed only along edges of the display area or application window.

* * * * *